United States Patent [19]

Wurdeman et al.

[11] 4,040,529
[45] Aug. 9, 1977

[54] GRAIN FLOW PROPELLED GRAIN SPREADER

[76] Inventors: Marion E. Wurdeman; James E. Wurdeman, both of Highway 30 East, Columbus, Nebr. 68601; Arnold F. Kopaska, Rte. 3, Guthrie Center, Iowa 50115

[21] Appl. No.: 687,194

[22] Filed: May 17, 1976

[51] Int. Cl.² .............................................. B65G 65/32
[52] U.S. Cl. ................................. 214/17 CB; 193/17
[58] Field of Search ............... 214/17 CB; 302/34, 60, 302/61; 193/17; 198/564

[56] References Cited

U.S. PATENT DOCUMENTS

| | | | |
|---|---|---|---|
| 2,557,977 | 6/1951 | Knoff | 214/17 CB X |
| 3,780,887 | 12/1973 | Bottoms | 214/17 CB |
| 3,885,684 | 5/1975 | Mitchell | 214/17 CB |

Primary Examiner—Robert G. Sheridan

[57] ABSTRACT

A grain propelled grain spreader having a hopper disposed beneath an opening in the upper end of a grain bin and having slides disposed beneath and receiving grain from a hopper, the slides extending downwardly and outwardly from the hopper so that grain flowing therefrom can be distributed around the inside of the bin as the grain is deflected from the slides by deflectors spaced along the sides, the hopper having fins mounted therein at angles with respect to the vertical such that grain hitting the fins will cause the hopper and slides to rotate together.

9 Claims, 7 Drawing Figures

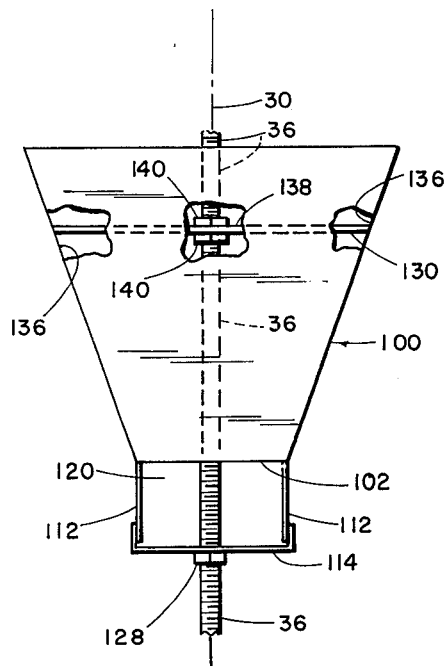
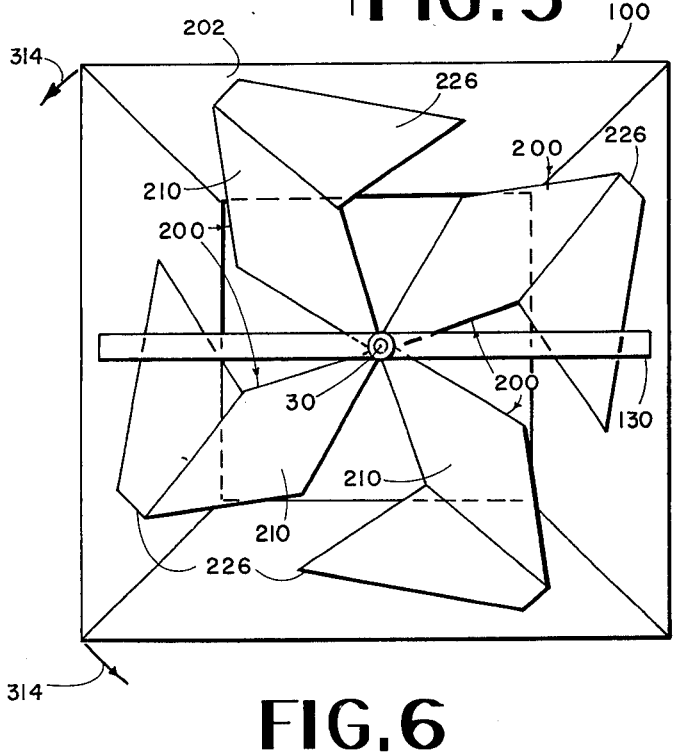
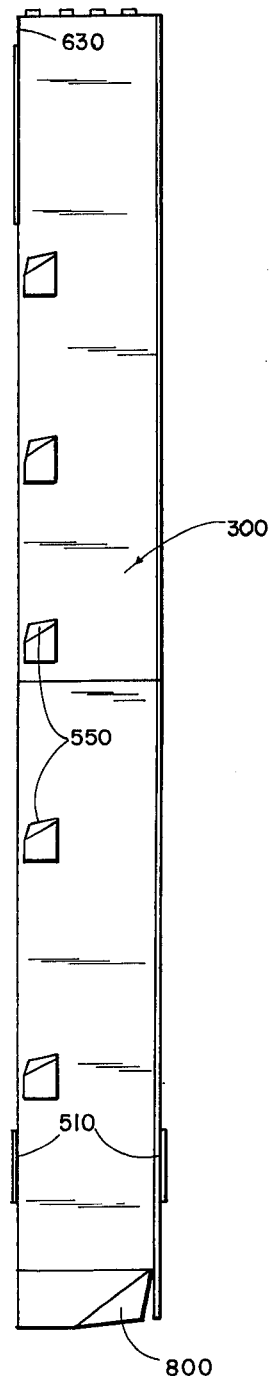
FIG. 5
FIG. 6
FIG. 7

GRAIN FLOW PROPELLED GRAIN SPREADER

FIELD OF THE INVENTION

This invention is in the field of grain spreaders which are disposed inside the grain bins for distributing grain as evenly as possible.

DESCRIPTION OF THE PRIOR ART

In the prior art grain spreaders have been motor-driven and have had motor-driven devices disposed beneath the upper opening in a grain bin which rotate for throwing grains striking such devices around the inside of the bin.

Disadvantages of such prior art devices are that they require electrical wiring, as is expensive, they require motors which can burn out, making long-run costs greater than necessary, and they introduce an electrical fire hazard.

It is desirable that a grain spreader be more adjustable so as to distribute grain and chaff evenly.

It is also desirable that a grain spreader be adjustable for size to fit grain bins of different sizes which may be on the same farm.

SUMMARY OF THE INVENTION

A grain propelled grain spreader having a hopper disposed beneath an opening in the upper end of a grain bin and having slides disposed beneath and receiving grain from a hopper, the slides extending downwardly and outwardly from the hopper so that grain flowing therefrom can be distributed around the inside of the bin as the grain is deflected from the slides by deflectors spaced along the sides, the hopper having fins mounted therein at angles with respect to the vertical such that grain hitting the fins will cause the hopper and slides to rotate together.

Another objective is to provide a grain spreader as described in which economy is achieved by having slides that are specifically two in number disposed extending diammetrically opposite each other away from an axis of rotation.

A further objective is to provide slides which are attached to the trough by means of a pivoting connection with the slides supported by a chain means which latter is adjustable to change the inclination.

A further objective is to provide a grain spreader the slides of which can be of various lengths by adding sections thereto so that the same central part of the grain spreader can be used even though the spreader is used on grain bins of various sizes.

A further objective is to provide a grain spreader which can handle any size of grain delivery rate of flow or, in other words, any kind of auger that would normally be used to deliver grain to a grain bin.

A further objective is to provide a grain spreader that works with top efficiency and yet requires no electrical power and which works efficiently for bins large and small, and which has successfully been used in bins of diameter up to 40 feet when standard length slides are used and up to 60 feet when slide extensions are used.

Another object is to provide a grain spreader which can be attached to bins with top-opening diameters which vary greatly by attaching to the collar at the opening with adjustable hooks.

An object is to provide a grain spreader with troughs or slides which are easily adjusted to the pitch of the roof of the grain bin and to which additional sections of trough or slide can be added in only a few minutes.

An objective is to provide a grain spreader which adjusts itself for speed, the greater the flow of grain, the faster the faster the rotation of the spreader.

BRIEF DESCRIPTION OF THE DRAWING

FIG. 5 is a side elevation of the hopper portion of the grain spreader with portions above and below broken away and the grain slides not being shown.

FIG. 6 is a top plan view of the hopper of FIG. 5 for showing the fins mounted in the hopper to illustrate how grain hitting the fins can cause the hopper and slides to rotate.

FIG. 7 is a side elevation of one of the slides of the invention showing the deflectors thereon.

DESCRIPTION OF THE PREFERRED EMBODIMENTS

Figure 1:
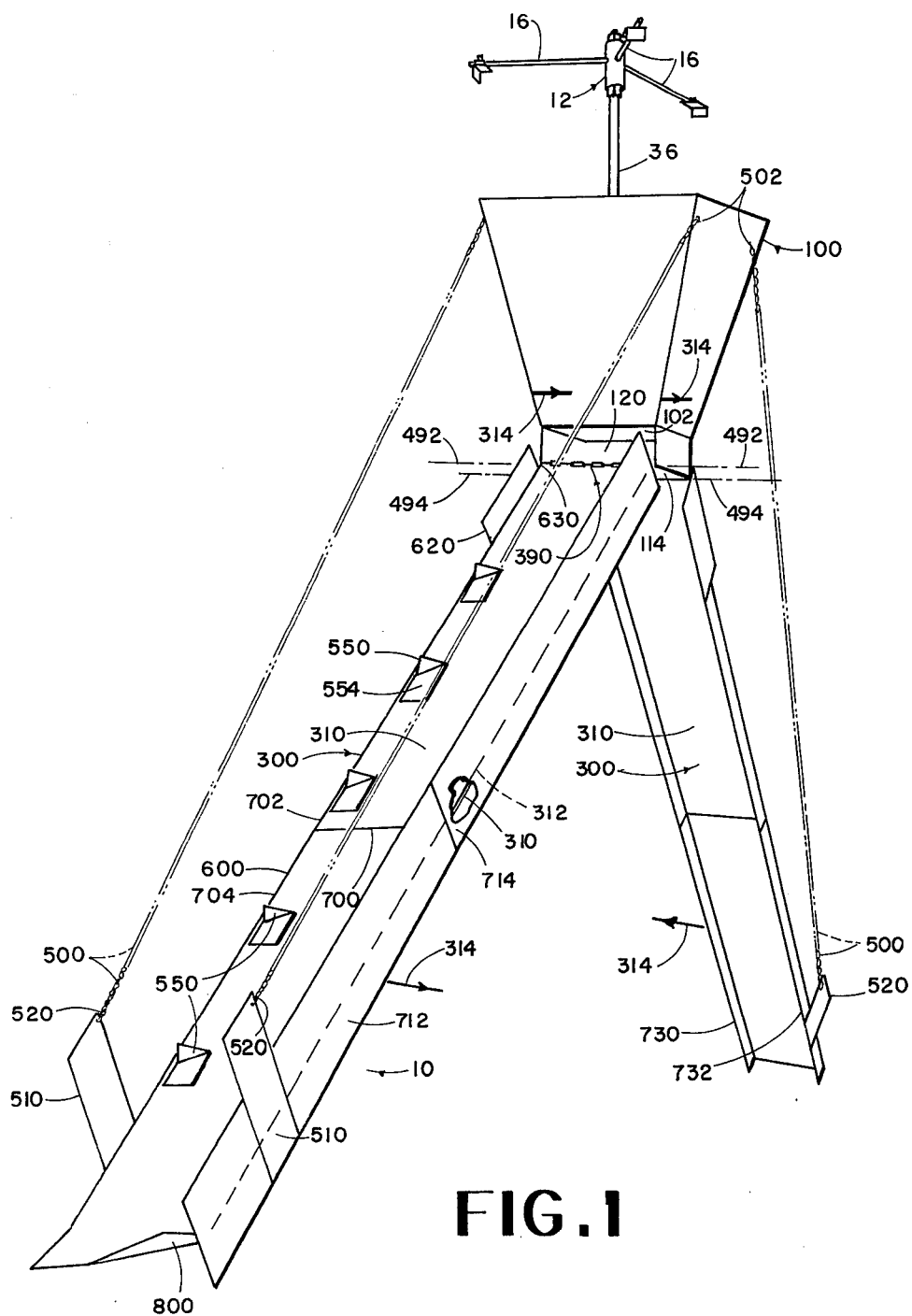
FIG. 1 is a perspective view looking horizontally at the grain propelled grain spreader of this invention, portions of support chains being shown in dotted lines.
Figure 2:
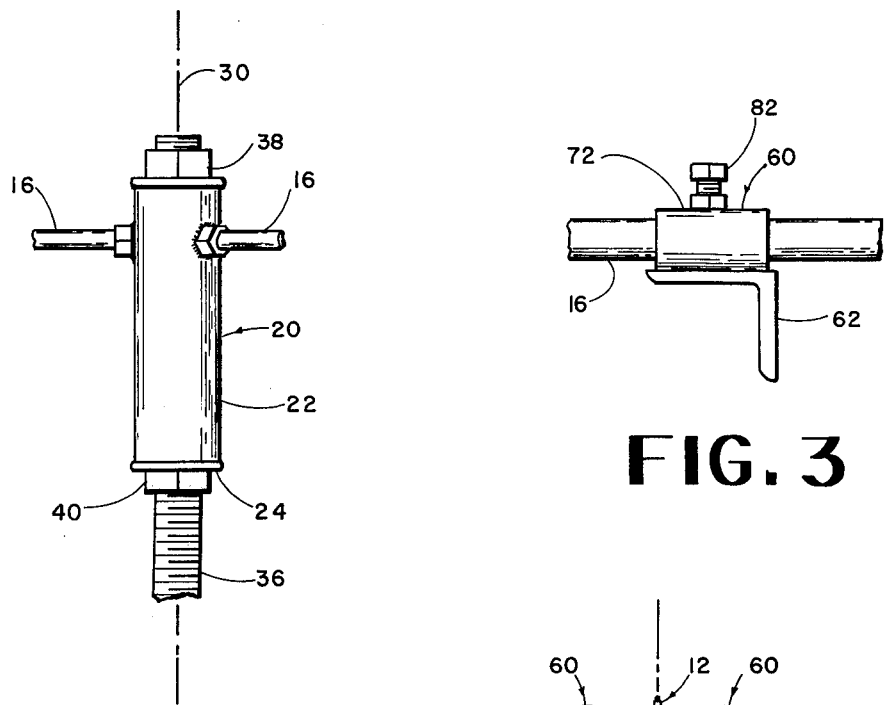
FIG. 2 is a side elevation of the rotating connection assembly of the invention with outer portions being broken away.
Figure 3:
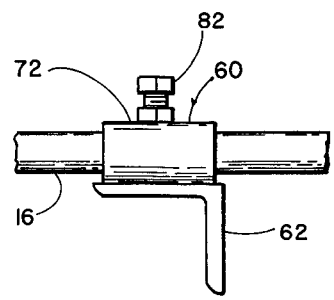
FIG. 3 is a view showing an outer portion of one of the arms of the rotating connection assembly with the adjustable hook mounted thereon as seen in side elevation.
Figure 4:
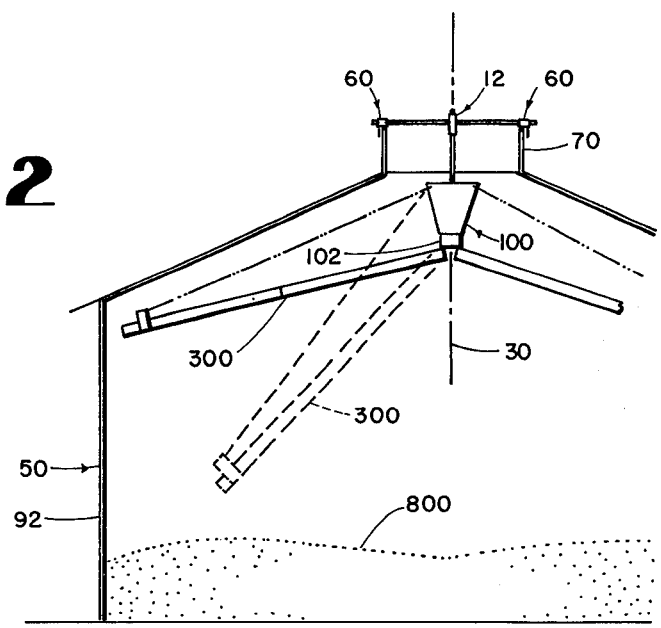
FIG. 4 is a side elevation of a portion of a grain bin with the forward half broken away and showing inside grain and also the grain flow propelled grain spreader of this invention shown diagrammatically in full lines in an upper operating position and in dotted lines in a lower position for showing the variety of positions of possible adjustment.

The grain propelled grain spreader of this invention is generally indicated at 10 in FIG. 1 and comprises a rotating connection assembly, generally indicated at 12 in FIG. 1, and comprising support arms 16, which can be three in number, and which latter are attachable to the upper part of a grain bin because the connection assembly 12 further comprises a bearing 20 having an outer housing 22 which is stationary with respect to a grain bin, generally indicated at 50 in FIG. 4, the housing 22 having a rotating inner portion 24, which latter rotates within the housing 22 about a vertical axis 30, a vertically extending threaded shaft 36 being disposed inside the inner portion 24 of the bearing 20, and being fixed vertically with respect thereto by adjustment nuts 38 and 40 disposed above and below the inner portion 24.

The arms 16 are suitably attached to the housing 22 and extend radially outwardly from the axis 30 and have hook assemblies 60 on their outer ends, having depending portions 62, which latter are adapted to be hooked over the outer side of the upper cylindrical collar 70 of a grain bin 50, as best seen in FIG. 4.

The hook 60 has sliding cylindrical portions 72 attached to the flanges 62 and disposed there above and slidably receiving therethrough respective ones of the arms 16.

Each sliding cylindrical portion 72 can slide along an arm 16 for adjustment and then is fixed in place by a set screw 82 which clamps a portion 72 to an arm 16 in a position for holding the flange 62 in a snug position against the outside of the collar 70.

Because the portion 72 of the hook 62 are horizontally adjustable on respective arms 16, they can be positioned to be received on collars 70 of different size grain bins having different sized diameter collars 70 so as to place the axis 30 vertically above the center of the grain bin, such bins usually having cylindrical outer walls 92 symmetrical about the axis 30.

A hopper 100 which can be square at its upper end, as best seen in FIG. 6, is open at the top and also open at its square lower portion 102, which latter is also open, as best seen in FIG. 5.

The hopper 100 has downwardly depending vertical walls 112 on two of its sides providing grain outlet openings 120 therebetween on the other two sides, the lower end of each of the walls 112 is supported by a horizontal carrier 114 attached to the walls 112 and extending there under so that a nut 128 under the carrier 114 and received on the threaded shaft 36 supports the carrier 114 and holds the hopper 100 up into a desired position. An elongated positioner 130 can be seen in FIG. 5 to be fixed to two opposite walls of the hopper 100, such walls being seen at 136. The positioner 130 extends across the axis 30, and has an opening at its center receiving the threaded shaft 36 therethrough, such opening being seen at 138, whereby nuts 140 on the threaded shaft 36 can be made tight against upper and lower sides of the positioner 130 so as to firmly hold the hopper in place, assisted also by the nut 128 earlier mentioned.

Fins 200 are attached to the hopper beneath the positioner 130 and are preferably disposed at least mostly above the bottom of the hopper so that grain coming through the top opening 202 of the hopper will strike deflecting surfaces 210 of the fins. The fins are each disposed at an angle with respect to the vertical such that grain coming through the top of the bin by delivery through the collar 70 and directly into the top of the hopper 100 will fall downwardly striking the deflecting surfaces 210, causing the hopper to rotate as the grain passes through and out the openings 120 on each side of the bottom of the hopper.

Each fin 200 is attached to the hopper to make this possible. The attachment being economically achieved by having each fin 200 made of sheet metal and by having a fin mounting sheet metal portion 226 for each fin 200 and attached to the latter at that end of each deflecting surface 210 which is farthest from the axis 30.

The sheet metal portions 226 and the fins 200 are each respectively formed of the same piece of metal which has been bent. The fin mounting portions 226 are suitably attached to the respective walls of the hopper 100, there being four fins 200 and four sides to the hopper 100.

The hopper 100 is actually in the form of an inverted frustro-pyrimidical shape with its largest end facing upward.

A plurality of elongated troughs or slides extend radially outwardly from the axis 30 and more specifically from two outer edges of the carrier 114 when two slides or troughs 300 are used.

Regardless of how many slides 300 there are, they should be symmetrically balanced about the axis 30. The word "slides" is chosen for the members 300 because sometimes trough might be thought of as a device having a bottom and two elongated side walls. However, the slides 300 each have a bottom wall 310, but have only one side wall 312 projecting upwardly therefrom, the side wall 312 of each slide 300 being on that side thereof which faces forwardly as regards the direction of rotation of the slides 300, such direction being the direction being indicated by the arrows 314 of FIGS. 1 and 6.

As best seen in FIG. 1, each slide 300 has its bottom wall 310 hinged by a hinge assembly generally indicated at 390 to a respective one of two opposite sides of the carrier 114 for the hinging of the slides about respective horizontal axes which are at right angles to the vertical axis 30, such horizontal axes being seen at 492 and 494, whereby the slides 300 can swing upwardly and downwardly at their outer ends but are prevented from swinging downwardly by support chains 500, which latter extend along each side of each slide as would be seen in top plan view and each are attached to a respective same side of the top of the hopper 100, as seen at 502 in FIG. 1, the lower end of each chain being attached to a chain support 510, which latter is attached to and extends upwardly from the respective slide 300 on the respective side thereof. Therefore, there are two chain supports 510 at the bottom of each of the slides and two chains are used for each slide for holding the lower ends up in an adjustable fashion inasmuch as the connection between each chain 500 and the support 510 can be varied by attaching a connector 520 which connects a respective chain to a chain support 510 so as to connect the support 510 to the chain 500 at any desirable place on the chain. The connectors 520 can be made in any suitable fashion, preferably such as to be easily disconnected for adjustment.

On the opposite side of each of the slides 300 from the respective barrier wall or side wall 312 are a plurality of deflectors 550 which are spaced apart vertically with respect to each other and along the slide and which are each provided with a base 554 attached to and forming a part of the same piece of material of which the deflector is made respectively, the bases 554 being disposed against and attached to the respective bottom wall 310 of a respective slide. The deflectors 550 extend upwardly from a respective slide and are inclinedly disposed with respect to the length of the slide and are lower at their ends which are closer to the edge of the bottom wall 310 to which they are adjacent than they are at their inner ends, whereby grain striking the deflectors 550 will tend to be deflected off of the trailing edge 600 of a respective slide, deflection in that direction also further enhancing rotary motion of the slide and hopper assembly in the direction of the arrows 314.

A special top retainer wall 620 is attached to the respective slide 310 and is disposed adjacent the top end thereof and is designed to prevent excess flow of grain off of the slide at that place and to deflect grain downwardly so that it is likely to hit the deflectors 550. A slight space can exist between the upper end of the special wall 620 and the upper end of the respective slide 310, such space being indicated at 630 as can be useful to allow some grain to pass out and off of the respective edge of the slide at the top thereof.

Referring to FIG. 1 it can be seen that the slides 300 can each have two sections joined together at 700 where they abut each other, the sections being an upper section 702 and a lower section 704.

Each slide has its side wall 312, earlier described, made also into two sections which abut each other, said sections being a lower section 712 and an upper section 714 joining each other at substantially the same place as the abutment line 700, just mentioned. The slide sections 702 and 704 can be secured together in any suitable manner so as to be detachable with respect to each other so that only the upper section 702 might be used when a smaller bin is involved.

As best seen in FIG. 1, the slides have downwardly extending flanges 730 and 732 on their under sides disposed at each side thereof for providing strength.

Referring to FIGS. 1 and 7, an upturned deflector flange is provided at the lower end of each slide, the flange 800 of each slide being disposed at an inclination with respect to the length of the slide for causing grain to be deflected downwardly and rearwardly from the slide, the word rearwardly meaning rearwardly as regards the direction of slide rotation indicated by the arrows 314 of FIG. 1.

We claim:

1. A grain spreader comprising support means attachable to an upper part of a grain bin, a hopper disposed beneath said support means, means rotatably mounting said hopper on said support means for rotation about a vertical axis, fins attached to said hopper and disposed at least mostly above the bottom of said hopper, said fins being disposed at angles with respect to the vertical such that when grain is directed so as to flow into the top of said hopper said grain will strike said fins and exert forces on said fins causing rotation of said hopper in a given direction, said hopper having an open top and bottom, a plurality of elongated slides each extending downwardly from the underside of said hopper and away from said axis at an angle with respect to the vertical and disposed such that said grain can flow out of the bottom of said hopper and down said slides, means attaching said slides to said hopper so that said slides are maintained in the position described, each slide having a leading side and a trailing side with respect to the rotation of said hopper, each slide having a barrier wall means on the leading side thereof so as to restrain grain from spilling off said leading side, means along each said slide and so disposed as to cause grain gravitating down said slides to fall at various positions from the trailing side along the length thereof.

2. The grain spreader of claim 1 in which said means attaching said slides to said hopper provide a pivoting connection permitting upward and downward movement of the outer end of each slide respectively, and further said means attaching said slides to said hopper further comprising support means interconnecting the outer end of each slide to a position on said hopper such that the outer end of each slide is restrained from downward movement.

3. The grain spreader of claim 2 in which said support means supporting the outer ends of each of said slides being adjustable so that said slides can be caused to incline downwardly from said hopper at various selected angles with respect to the vertical.

4. The grain spreader of claim 1 in which said slides are made up of sections connected together in a removable fashion whereby said slides can be made of lesser length when desired.

5. The grain spreader of claim 1 in which said support means comprises a plurality of arms extending generally outwardly from said axis, each of said arms having a hook assembly slidably attached thereto, each of said hook assemblies having a downwardly extending flange adapted to be extended downwardly on the outer side of a collar of a grain bin in close relationship thereto for positioning said arms with respect to said collar, means for adjustably fixing said hook assemblies to said respective arms so that the hook assemblies can be placed in various positions along the length of said arms respectively.

6. The grain spreader of claim 5 having a bearing extending along said axis and disposed between said arms, said bearing having an outer housing affixed to said arms.

7. A grain spreader as described in claim 6 in which a threaded shaft extends vertically along said axis and is mounted inside said bearing housing for rotation with respect thereto, means along said threaded shaft for preventing vertical movement of said threaded shaft with respect to said bearing housing, and mean attaching said threaded shaft to said hopper.

8. The grain spreader of claim 1 in further combination with a grain bin surrounding said grain spreader hopper and slides, said grain bin having a collar at the top thereof, said support means being supported by said collar.

9. The grain spreader of claim 1 in which said means on said slides for causing grain to leave said slides at various positions spaced downwardly from the top of said slides comprises a plurality of upwardly extending deflectors disposed on said slides on the trailing side thereof in positions for being struck by grain flowing down said slides, said deflectors each being disposed at an inclination with respect to the elongation of the respective slide such that when grain strikes said deflectors as it flows down said slides, said deflectors being disposed at various distances from the top of each slide respectively so that grain is caused to flow off from each slide at points disposed various distances from said axis.

* * * * *